(12) United States Patent
Shino

(10) Patent No.: US 11,611,669 B2
(45) Date of Patent: Mar. 21, 2023

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Ikuko Shino, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/732,125

(22) Filed: Apr. 28, 2022

(65) Prior Publication Data

US 2022/0256044 A1 Aug. 11, 2022

Related U.S. Application Data

(63) Continuation of application No. 17/390,629, filed on Jul. 30, 2021, now Pat. No. 11,350,002.

(30) Foreign Application Priority Data

Aug. 5, 2020 (JP) .............................. JP2020-133366

(51) Int. Cl.
*H04N 1/00* (2006.01)
(52) U.S. Cl.
CPC ..... *H04N 1/00413* (2013.01); *H04N 1/00482* (2013.01); *H04N 2201/0094* (2013.01)

(58) Field of Classification Search
CPC .......... H04N 1/00413; H04N 1/00482; H04N 2201/0094
USPC ....................................................... 358/1.13
See application file for complete search history.

(56) References Cited

U.S. PATENT DOCUMENTS

| | | | |
|---|---|---|---|
| 8,570,554 B2 * | 10/2013 | Haruta | H04N 1/00482 358/1.15 |
| 9,479,671 B2 | 10/2016 | Bando | |
| 9,654,656 B2 * | 5/2017 | Akuzawa | H04N 1/00482 |
| 2013/0050731 A1 * | 2/2013 | Fukuoh | H04N 1/00482 358/1.13 |
| 2019/0222637 A1 | 7/2019 | Kanasaki | |

FOREIGN PATENT DOCUMENTS

CN 110968374 A 4/2020

* cited by examiner

*Primary Examiner* — Neil R McLean
(74) *Attorney, Agent, or Firm* — Canon U.S.A., Inc. IP Division

(57) ABSTRACT

An information processing apparatus executes a document reading operation at a timing when a button is pressed, and displays a confirmation screen for prompting a user to confirm settings for processing during execution of the document reading operation.

18 Claims, 16 Drawing Sheets

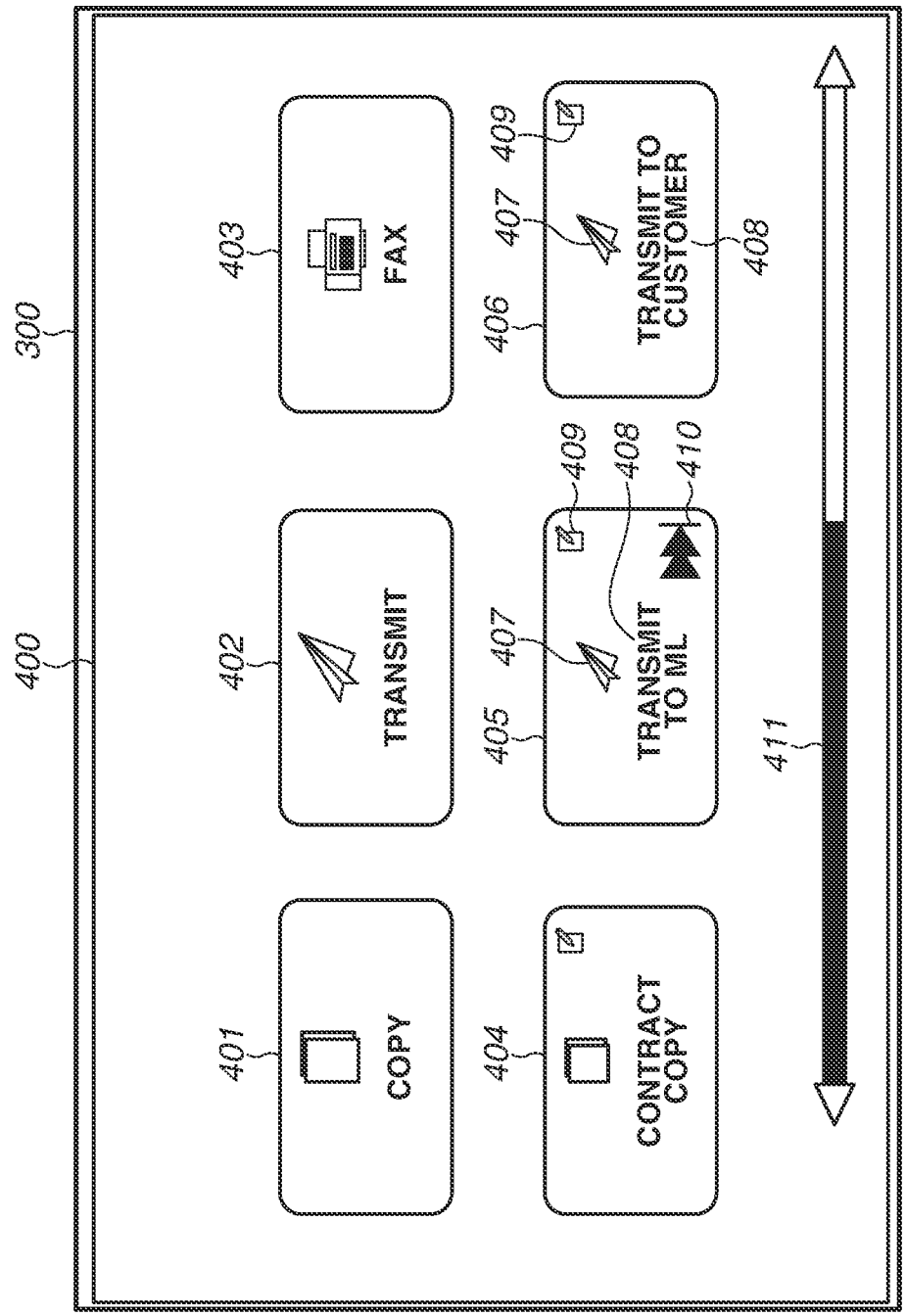

FIG.8

| CUSTOM BUTTON NO | APPLICATION ID | ACTION ID | | ICON INFORMATION | | BUTTON NAME |
|---|---|---|---|---|---|---|
| 1 | 100 | 1 | 00 | copy.bmp | — | CONTRACT COPY |
| 2 | 101 | 1 | 01 | send.bmp | skipstart.bmp | TRANSMIT TO ML |
| 3 | 101 | 2 | 00 | send.bmp | — | TRANSMIT TO CUSTOMER |

| ACTION ID | ICON INFORMATION | SETTING INFORMATION |
|---|---|---|
| 1 | 01 | send.bmp | skipstart.bmp | ADDRESS: MAILING LIST OF DEPT. 11, COLOR: GRAYSCALE, DOUBLE-SIDED DOCUMENT: DOUBLE-SIDED |
| 2 | 00 | send.bmp | — | ADDRESS: A CORPORATION, B CORPORATION, COLOR: GRAYSCALE, FILE FORMAT: JPEG |

| ACTION ID | ICON INFORMATION | SETTING INFORMATION | NUMBER OF EXECUTIONS |
|---|---|---|---|
| 1 | 01 | send.bmp | skipstart.bmp | ADDRESS: MAILING LIST OF DEPT. 11, COLOR: GRAYSCALE, DOUBLE-SIDED DOCUMENT: DOUBLE-SIDED | 0 |
| 2 | 00 | send.bmp | — | ADDRESS: A CORPORATION, B CORPORATION, COLOR: GRAYSCALE, FILE FORMAT: JPEG | 8 |

910

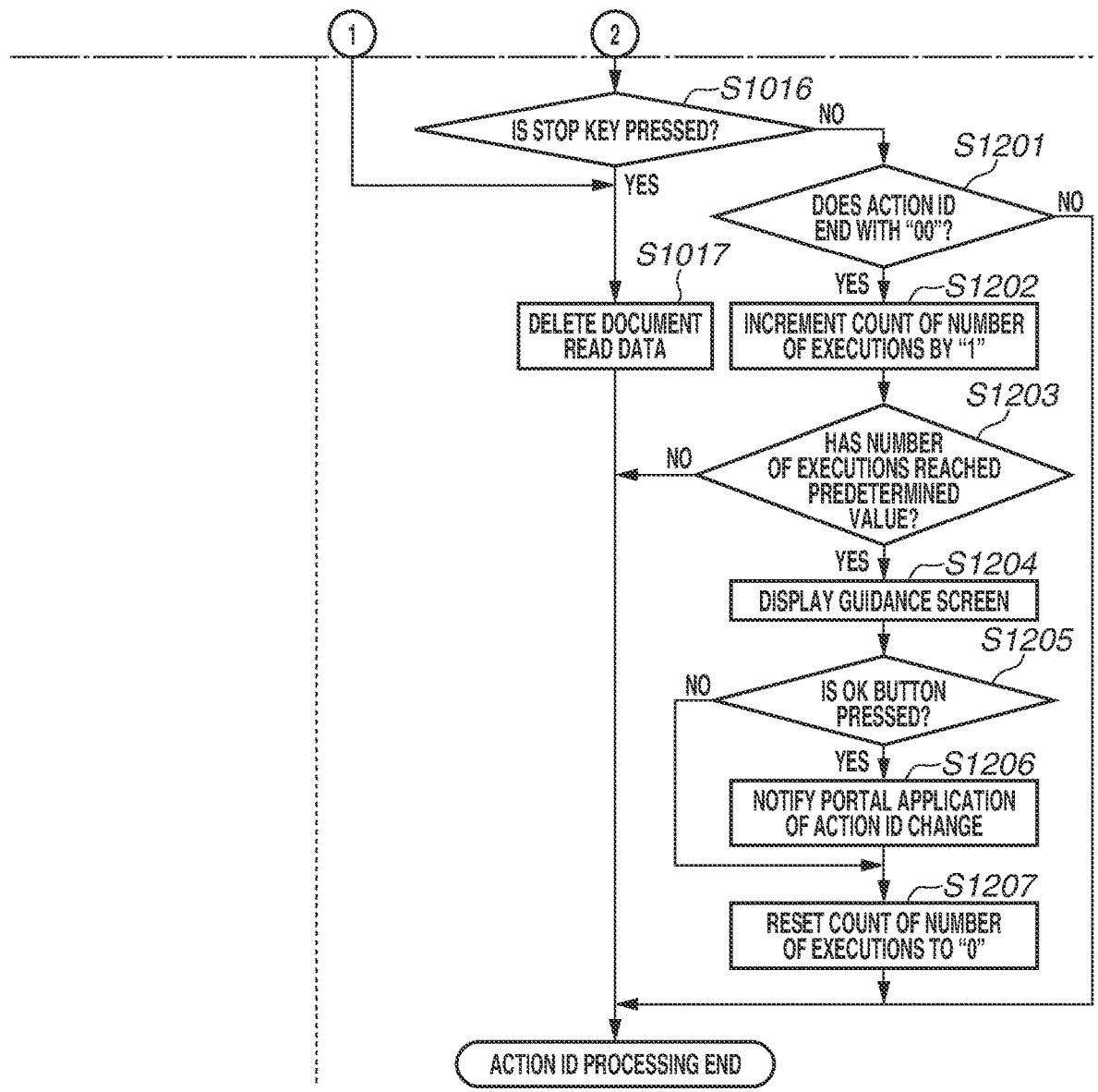

INFORMATION PROCESSING APPARATUS, INFORMATION PROCESSING METHOD, AND STORAGE MEDIUM

CROSS-REFERENCE TO RELATED APPLICATIONS

This application is a continuation, and claims the benefit, of U.S. patent application Ser. No. 17/390,629, filed on Jul. 30, 2021, which claims the benefit of, and priority to, Japanese Patent Application No. 2020-133366, filed on Aug. 5, 2020. The above cited patent applications are incorporated herein by reference in their entirety.

BACKGROUND OF THE INVENTION

Field of the Invention

The present invention relates to an information processing apparatus, an information processing method, and a storage medium.

Description of the Related Art

Image processing apparatuses (e.g., a multi-function peripheral (MFP)) to be installed in offices have recently become more multifunctional and highly functional. With such development, a menu screen for an MFP is configured to display a plurality of buttons for executing various functions. A user presses a desired button on the menu screen to open a setting screen for processing corresponding to the button, so that the user can make settings and then instruct execution of the processing. Each button is associated with a setting value, and the user can also newly register a button (hereinafter, a custom button) generated by changing the setting value associated with the button to a desired setting value on the main screen. When the registered custom button is pressed, a confirmation screen for prompting the user to confirm the setting value associated with the button is displayed and the processing associated with the button is executed upon reception of a user operation. Depending on the custom button, the processing associated with the custom button can be immediately executed only by pressing the custom button without the step of displaying the confirmation screen. Japanese Patent Application Laid-Open No. 2019-179380 discusses a method of switching, for each button, a processing execution method to one of the method of executing processing after a confirmation screen is displayed when the corresponding button is pressed and the method of executing processing without the step of displaying the confirmation screen. In a case where processing is executed immediately after the corresponding button is pressed, there is a possibility that the processing may be accidentally executed due to an erroneous operation by the user. It may be therefore desirable to display the confirmation screen for the user and to prompt the user to confirm processing contents in a case of executing processing, such as image data transmission processing, which may be preferably executed appropriately.

However, if the step of prompting the user to confirm processing contents is provided, the timing for executing the processing is delayed due to the corresponding amount of time for performing the step. In a case of using a button for executing processing including a document reading operation, in particular, document reading operation starts only when the user performs a predetermined operation after the button is pressed and the confirmation screen is displayed. It thereby takes a long period of time before processing is executed, which leads to a reduction in usability.

The present invention is directed to providing a method of rapidly starting processing associated with a button, while preventing a user from erroneously executing processing.

SUMMARY OF THE INVENTION

An information processing apparatus that displays a menu screen includes a first display unit, a second display unit, a first execution unit, and a second execution unit. The first display unit displays a display object for executing first processing including document reading processing on the menu screen. The second display unit displays a confirmation screen for prompting a user to confirm contents of the first processing upon reception of an operation on the display object displayed by the first display unit from the user. The first execution unit executes at least a part of the document reading processing in processing included in the first processing in parallel with the display of the confirmation screen by the second display unit. The second execution unit executes, in a case where a predetermined condition is satisfied, processing subsequent to the document reading processing in the processing included in the first processing.

Further features of the present invention will become apparent from the following description of exemplary embodiments with reference to the attached drawings.

BRIEF DESCRIPTION OF THE DRAWINGS

FIG. 4 is a schematic diagram illustrating an example of a portal screen.

FIG. 8 illustrates an example of custom button table information stored in a storage area of a portal application.

FIGS. 9A and 9B are schematic tables each illustrating an example of custom button table information stored in a storage area of a scan application.

FIGS. 12A and 12B are a flowchart illustrating processing executed when a custom button is pressed.

DESCRIPTION OF THE EMBODIMENTS

Exemplary embodiments of the present invention will be described in detail below with reference to the accompanying drawings. The following exemplary embodiments are not intended to limit the present invention according to the claims, and not all combinations of features described in the exemplary embodiments are essential to the solving means of the present invention. While the present exemplary embodiments illustrate an image processing apparatus as an example of an information processing apparatus, the present invention is not limited to this example.

The present exemplary embodiment illustrates a multifunction peripheral (MFP) 1 including a plurality of functions, such as a scanner function and a printer function, as an example of the image processing apparatus. However, the present invention is not limited to this example. An apparatus including a single function can also be applied.

Figure 1:
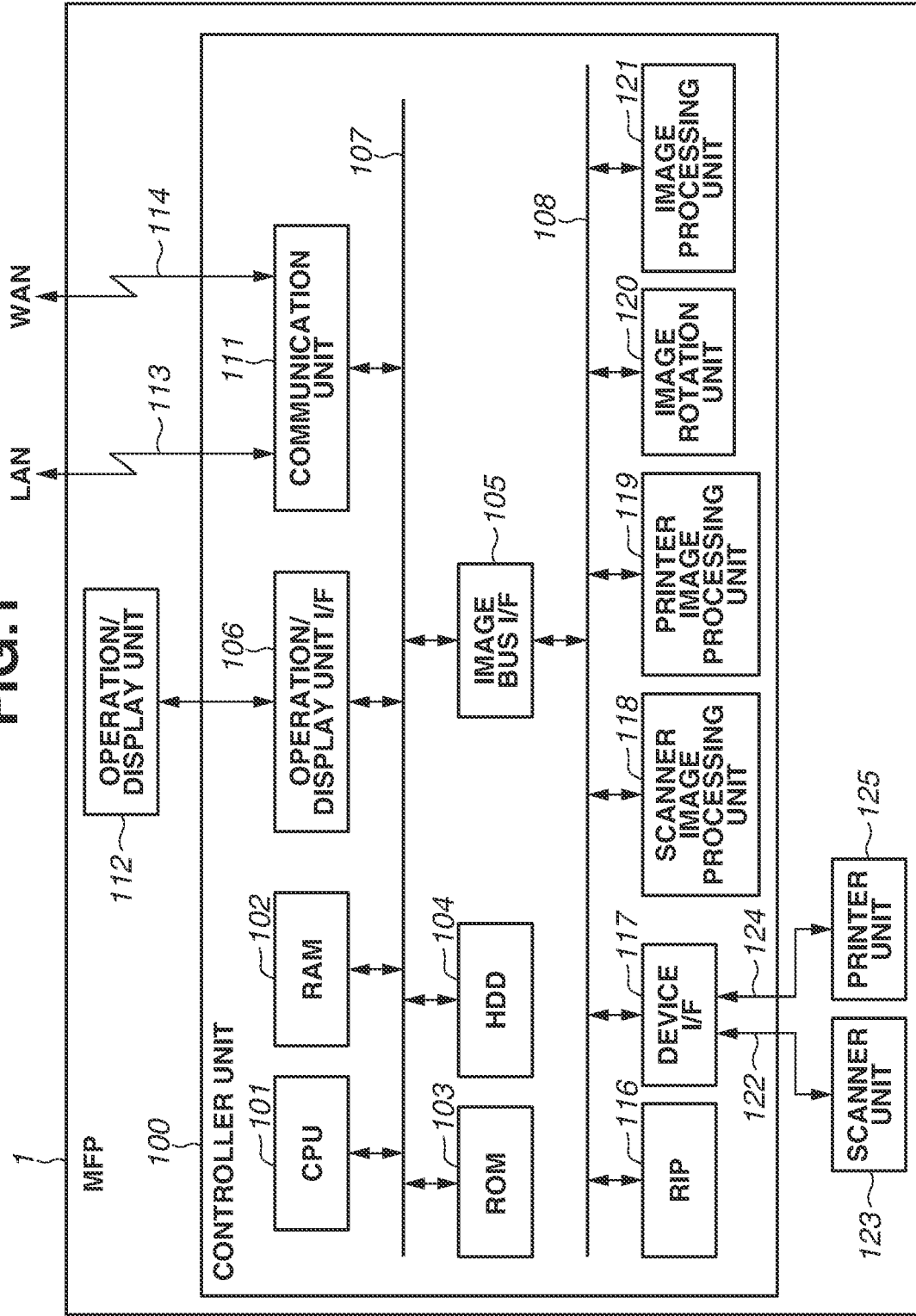
FIG. 1 is a block diagram illustrating an example of a hardware configuration of a multi-function peripheral (MFP) 1 according to an exemplary embodiment of the present invention.

FIG. 1 is a block diagram illustrating a hardware configuration of the MFP 1 according to a first exemplary embodiment. The MFP 1 illustrated in FIG. 1 includes, as a basic configuration, a controller unit 100 that controls each unit in the MFP 1, an operation/display unit 112, a scanner unit 123, and a printer unit 125. The operation/display unit 112 is composed of, for example, hardware keys, such as a numeric keypad for inputting numbers and a start key for instructing to execute processing, and a touch panel display. The operation/display unit provides a user interface (UI) used for a user to operate the MFP 1. The user can input information to the MFP 1 by touching (operating) icons or buttons (or hardware keys) displayed on the touch panel display of the operation/display unit 112.

The scanner unit 123 scans a document. The printer unit 125 conveys a recording sheet, and prints image data on the recording sheet as a visible image.

The controller unit 100 is connected to the scanner unit 123 via a bus 122, and is also connected to the printer unit 125 via a bus 124. The controller unit 100 is connected to another apparatus via a local area network (LAN) 113 or a wide area network (WAN) 114, and performs data input/output control processing.

A central processing unit (CPU) 101 executes and controls various functions included in the MFP 1. A random access memory (RAM) 102 functions as a system work memory for operation of the CPU 101, and also functions as an image memory for temporarily storing image data. A read-only memory (ROM) 103 functions as a boot ROM. The ROM 103 stores a system boot program. A hard disk drive (HDD) 104 stores system software, image data, and all wireless communication information included in a communication unit 111 described below.

The MFP 1 can add a function by installing an application that implements a function to be used by the user. By installation of applications, application programs for executing various functions on the MFP 1 are stored in the RAM 102 or the HDD 104.

An operation/display unit interface (I/F) 106 is an interface unit between the operation/display unit 112, which serves as a UI, and the controller unit 100. The operation/display unit I/F 106 outputs data to be displayed on the touch panel display to the operation/display unit 112. The operation/display unit I/F 106 also functions to transmit information input by the user from the operation/display unit 112 to the CPU 101. The communication unit 111 is connected to the LAN 113 and the WAN 114, and inputs and outputs information to and from an external apparatus. The communication unit 111 can also establish a wireless communication such as near field communication (NFC). The above-described functional units are connected to a system bus 107.

An image bus I/F 105 is a bus bridge that connects the system bus 107 to an image bus 108 for transferring image data at a high speed, and converts a data structure. The image bus 108 is a bus complied with, for example, a peripheral component interconnect (PCI) bus or the Institute of Electrical and Electronics Engineers (IEEE) 1394.

In the functional units disposed on the image bus 108, a raster image processor (RIP) 116 loads a page description language (PDL) code into a bitmap image. A device I/F unit 117 connects the scanner unit 123 or the printer unit 125 to the controller unit 100. A scanner image processing unit 118 performs correction, processing, or editing on input image data scanned by the scanner unit 123. A printer image processing unit 119 performs processing, such as correction and resolution conversion, on print output image data adapted to the printer unit 125. An image rotation unit 120 rotates image data. An image processing unit 121 performs compression/decompression processing, such as Joint Photographic Experts Group (JPEG), Joint Bi-level Image Experts Group (JBIG), Modified Modified Read (MMR), or Modified Huffman (MH), and format conversion processing, such as Portable Document Format (PDF), Tag Image File Format (TIFF), Optical Character Recognition (OCR), or encryption, on image data.

Figure 2:
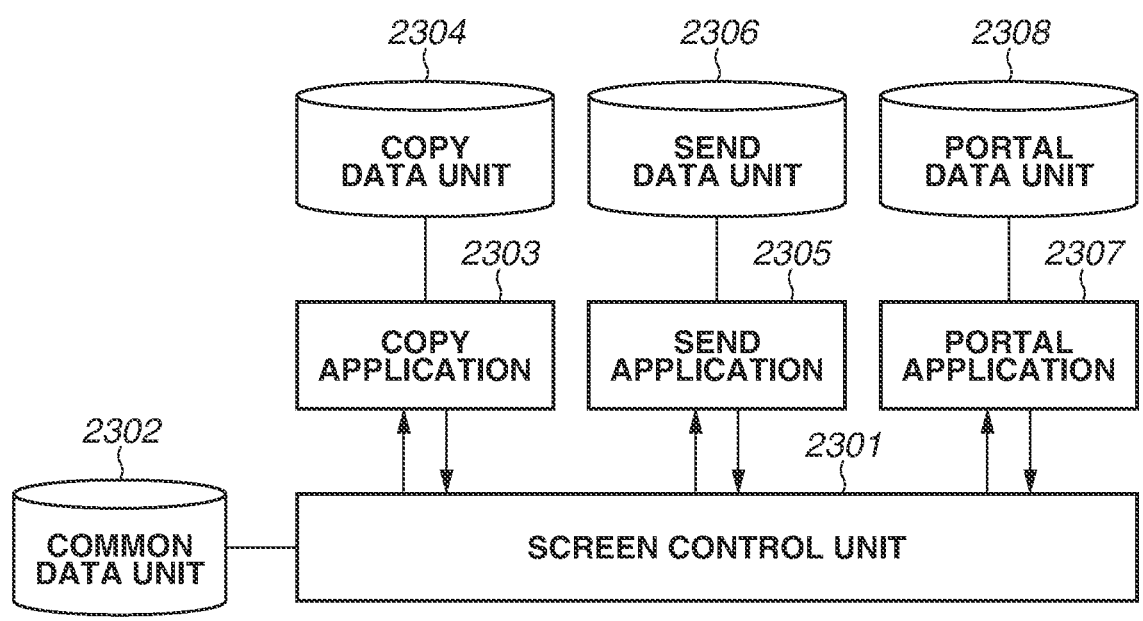
FIG. 2 is a block diagram illustrating a software configuration of the MFP 1 according to the exemplary embodiment.

FIG. 2 is a block diagram illustrating a software configuration of the MFP 1 according to the present exemplary embodiment. Each functional unit is implemented by the CPU 101 reading out control programs stored in the ROM 103 or the HHD 104 and executing the control programs.

Examples of applications to be installed in the MFP 1 include a copy application 2303 that uses a copy function of the MFP 1, a send application 2305 that uses a send function for transmitting read image data, and a portal application 2307 that includes a portal screen display function. A portal screen is a menu screen to be displayed when the user starts the operation of the MFP 1. These applications may be installed in the MFP 1 in default settings, or may be thereafter installed in the MFP 1 by the user through, for example, the communication unit 111. The installed applications are stored as application programs in the RAM 102 or the HDD 104.

The copy application 2303, the send application 2305, and the like installed in the MFP 1 operate independently based on an instruction from the CPU 101. Data to be used for each application is therefore divided into application groups to be stored in the HDD 104. Data to be shared by each application is stored as common data in a common data unit 2302 set in the HDD 104.

An application identification (ID) is allocated to a plurality of applications to be installed in the MFP 1, as an identifier for identifying each application. This application ID is stored as common data in the common data unit 2302. In the present exemplary embodiment, for example, the application ID for the copy application 2303 is "100", the application ID for the send application 2305 is "101", and the application ID for the portal application 2307 is "102".

A screen control unit 2301 controls a screen display performed by each application. For example, the screen control unit 2301 controls which one of the applications displays a screen. For example, the copy application 2303 acquires screen resources, or setting values from a copy data unit 2304 in response to a request from the screen control unit 2301, and displays the acquired information on the operation/display unit 112. In a case where data to be displayed is not stored in the copy application 2303, the screen control unit 2301 acquires the corresponding data from the common data unit 2302, and notifies the copy application 2303 of the acquired data.

The copy application 2303 performs processing for outputting image data generated by scanning a document by the scanner unit 123 onto a sheet or the like. The copy application 2303 can exchange data regarding copying with the copy data unit 2304 set in the HDD 104. The send application 2305 performs processing for transmitting image data generated by scanning a document by the scanner unit 123 to a predetermined address through the communication unit 111. The send application 2305 can exchange data on sending, such as address information, with a send data unit 2306 set in the HDD 104. The portal application 2307 performs processing for displaying the portal screen on the operation/display unit 112. The portal application 2307 can exchange data regarding the portal screen, such as a button arrangement sequence to be displayed on the portal screen, with a portal data unit 2308 set in the HDD 104.

The present exemplary embodiment illustrates an example where the MFP 1 includes three types of applications, e.g., the copy application 2303, the send application 2305, and the portal application 2307. However, the MFP 1 may also include applications other than these applications, e.g., a print application. Each application receives settings from the user through a setting screen and executes application processing.

Figure 3:
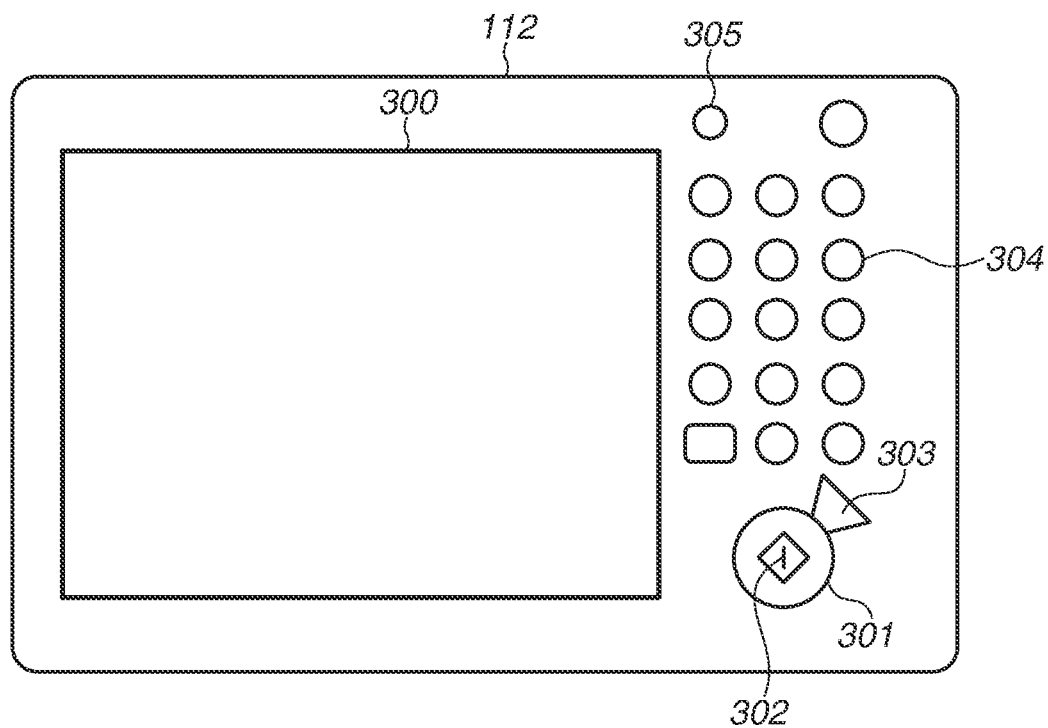
FIG. 3 illustrates an operation/display unit of the MFP 1 according to the exemplary embodiment.

FIG. 3 illustrates an example of the touch panel display and hardware keys corresponding to the operation/display unit 112 of the MFP 1 according to the present exemplary embodiment.

A touch panel 300 is a liquid crystal display unit in the present exemplary embodiment. The touch panel 300 has a configuration in which a touch panel sheet is attached to a liquid crystal display. The touch panel 300 displays an operation screen, and when a displayed object is pressed, the touch panel 300 transmits information indicating the position where the displayed object is pressed to the CPU 101. The hardware keys will now be described. A start key 301 is a key for instructing to start processing. In a case where, for example, the start key 301 is pressed when the setting screen for executing processing, such as scanning or copying, is displayed, the processing starts. A light-emitting diode (LED) 302 having two colors, e.g., green and red, is disposed at a central portion of the start key 301. These colors are used to indicate whether the MFP 1 is ready to execute processing when the start key 301 is pressed. A stop key 303 is a key for instructing to interrupt the operation being executed. A numeric keypad 304 includes keys for inputting numbers and characters. The numeric keypad 304 can be used to set, for example, the number of copies. A user mode key 305 is a key used to cause the display to transition to a screen for making settings for the MFP 1.

Figure 5A:
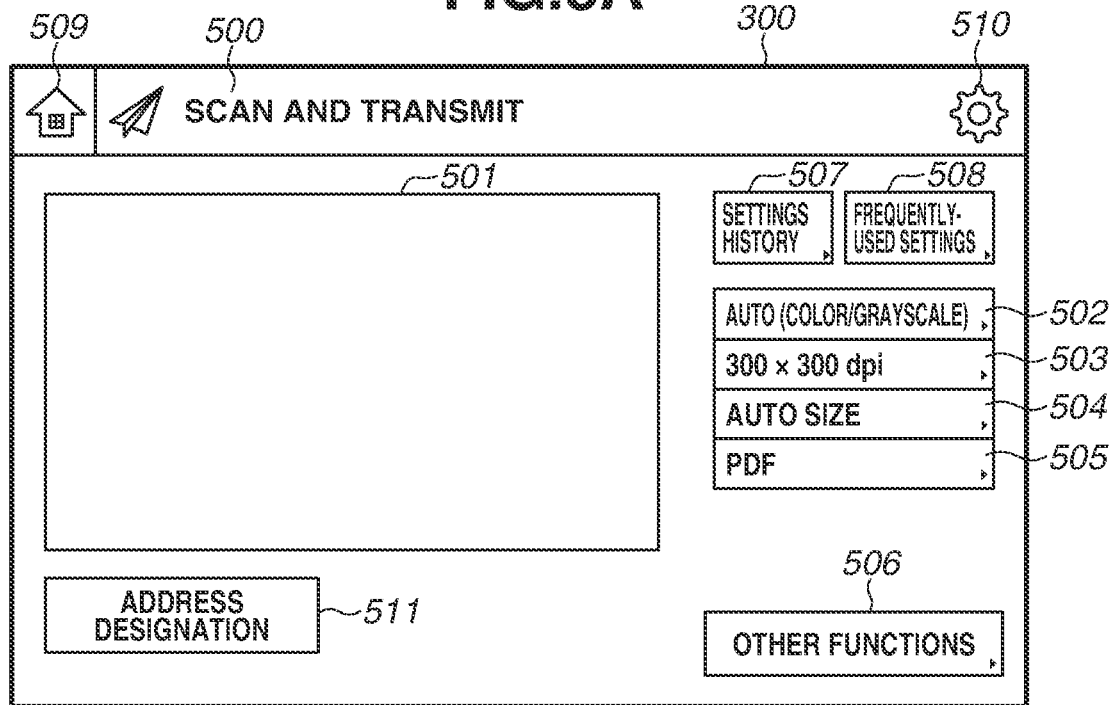
FIGS. 5A and 5B are schematic diagrams each illustrating an example of a transmission processing setting screen.

An application setting screen to be displayed on the touch panel 300 will be described with reference to FIG. 5. The send application 2305 will be described as an example of the applications.

Figure 5B:
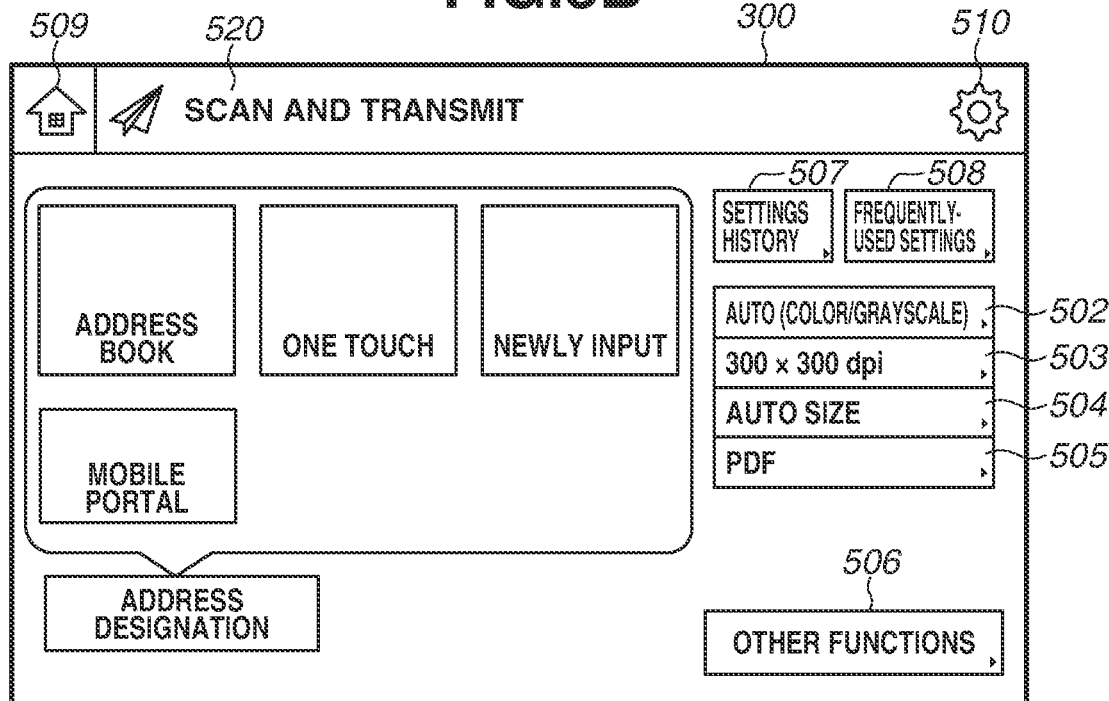

A send setting screen 500 is a setting screen to be displayed when the send application 2305 is selected by the user. The send setting screen 500 includes an area 501 on which an address designated by the user is displayed, and buttons 502 to 505 that are used to set, for example, a color, a resolution, a file format, and a sheet size. When any one of the buttons is pressed, the screen transitions to an advanced settings screen corresponding to each setting item. In this case, the setting screen associated with default setting values is displayed. Examples of buttons for setting basic send functions include the color selection button 502, the resolution selection button 503, the document size selection button 504, and the file format selection button 505. Settings for functions other than the above-described functions can be made and changed on a screen to be displayed when an other functions button 506 is pressed. A settings history button 507 is a button for displaying the history of send settings previously used by the user. A frequently-used settings button 508 is a button for displaying a screen for registering, editing, or calling frequently-used settings. A home button 509 is a button for returning to a portal screen 400 described below. A gear button 510 is a button for displaying setting items related to the entire application. Default settings illustrated in FIG. 5A indicate a state where "auto" is set on the color selection button 502, "300×300 dpi" is set on the resolution selection button 503, "auto size" is set on the document size selection button 504, and "PDF" is set on the file format selection button 505. When an address designation button 511 is pressed, a screen for setting an address to which data is transmitted is displayed as illustrated in FIG. 5B. The user sets an address after selecting an address selection method, i.e., selecting an address from among the addresses registered in the MFP 1 on the screen, or directly inputting an address on the screen. When the user places a document on the scanner unit 123 and presses the start key 301 in a state where the address is set, the CPU 101 executes processing with set contents. Specifically, the scanner unit 123 executes scanning of a document when the user presses the start key 301, and after the scanning is completed, the scanner image processing unit 118 generates image data to be transmitted based on the settings on the setting screen. The communication unit 111 transmits the generated image data to the designated address.

FIG. 4 is a schematic diagram illustrating an example of the portal screen 400 display on the touch panel 300. On the portal screen 400, a display object for executing each application, i.e., a display object, such as a button or a key, which is associated with application processing and a setting value. In this case, the portal screen 400 displays, for example, buttons (hereinafter referred to as application buttons) 401 to 403 that are associated with default setting values (e.g., factory-configured initial values), and buttons (hereinafter referred to as custom buttons) 404 to 406 that are registered on the portal screen 400 by changing the default setting values associated with the application buttons by the user. When, for example, the application button 402 is pressed by the user, the setting screen for the send application 2305 in which the default setting values are reflected is displayed as illustrated in the send setting screen 500.

The custom buttons 405 and 406 are custom buttons for the send application 2305 to transmit image data to the set address. When the custom button 406 is pressed, as illustrated in FIG. 7E, a settings confirmation screen 709 is displayed for prompting the user to confirm the settings. When an OK button 716 is pressed, processing associated with the custom button 406 is started. The custom button 405 is a custom button for immediately starting processing associated with the custom button 405 without the step of displaying the settings confirmation screen 709. Executing processing associated with a button without the step of displaying the confirmation screen when the button is pressed is referred to as immediate execution. Each of the custom buttons 405 and 406 displays an icon 407 indicating an application, a button name 408, and an icon 409 indicating a custom button. An immediate execution icon 410 indicating an immediate execution button is also displayed on the custom button 405. The immediate execution icon 410 is not displayed on the custom button 406, which does not correspond to the immediate execution button.

A slider bar 411 indicates that the portal screen 400 can transition to another screen by a slide operation. When the user slides the slider bar 411, presses an arrow, or flicks the portal screen 400, the CPU 101 receives the input and calls an application button or a custom button registered on the screen, which has transitioned from the previous screen, from the HDD 104, and displays the application button or the custom button.

The custom buttons will be described with reference to FIG. 8. Information about the custom buttons 404 to 406 is stored as table information illustrated in FIG. 8 in the portal data unit 2308 and the common data unit 2302. Examples of the information include an identifier for each application, a button name, and icon information. Information about the custom buttons 404 to 406 is stored in a button information table 800 illustrated in FIG. 8. The button information table 800 is used when the custom buttons are displayed on the portal screen 400 or processing corresponding to each custom button is executed. In the button information table 800, a custom button number (No.) for uniquely identifying the custom button is associated with an application ID, an action ID, icon information, and a button name. The custom buttons 404 to 406 correspond to custom button Nos. 1 to 3, respectively.

The application ID indicates an identifier for uniquely identifying an application corresponding to a button. For example, the application ID for the copy application 2303 is "100", and the application ID for the send application 2305 is "101". The action ID is an identifier for calling a setting value associated with a button as described in detail below. When any one of the custom buttons is pressed, the action ID is sent to the application indicated by the application ID corresponding to the pressed button. The application to which the action ID is sent calls the setting value that is stored in association with the action ID, and executes processing using the setting value. If the action ID ends with "00", this indicates that the button does not correspond to the immediate execution button. If the action ID ends with "01", this indicates that the button corresponds to the immediate execution button. The icon information includes image data, such as image data of a bitmap format corresponding to the icon 407, or a path to the image data. If the pressed button corresponds to the immediate execution button, an image data name indicating the immediate execution icon 410 is displayed. The button name represents the contents displayed on the button name 408.

Figure 6:
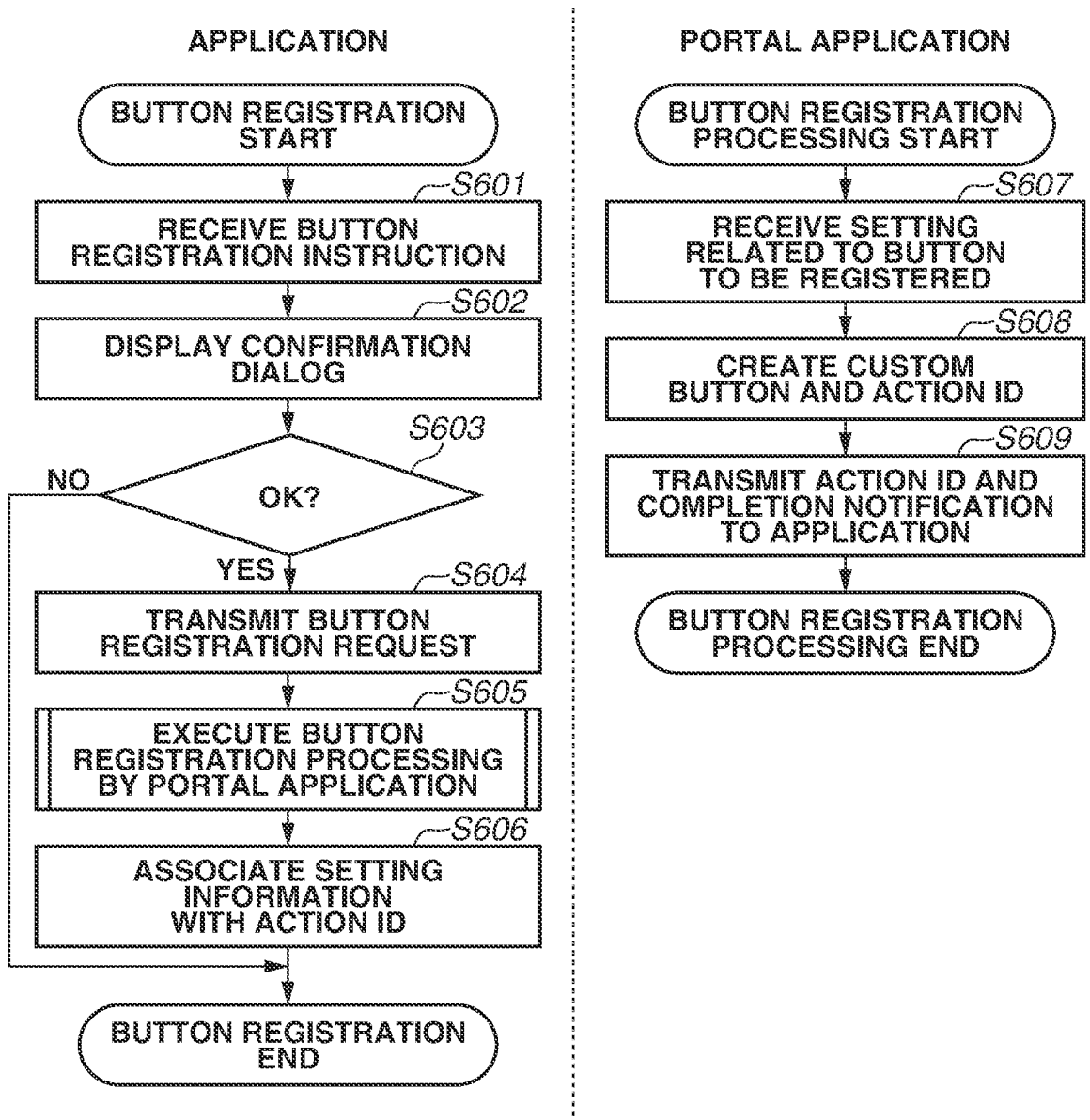
FIG. 6 is a flowchart illustrating processing for registering a custom button.

FIG. 6 is a flowchart illustrating processing for registering a custom button in each application. Each processing in the flowchart is implemented by the CPU 101 reading out control programs stored in the ROM 103 or the HHD 104 and executing the control programs. To clearly distinguish processing to be executed by the send application 2305 from processing to be executed by the portal application 2307, the processing to be executed by the send application 2305 is illustrated on the left part of FIG. 6, and the processing to be executed by the portal application 2307 is illustrated on the right part of FIG. 6. An example will be described here where the send application 2305 registers, on the portal screen 400, the custom button No. 3 ("transmit to customer" button 406) generated by changing the default settings illustrated in FIG. 5A such that "A Corporation" and "B Corporation" are set as the address, "grayscale" is set as the color, and "JPEG" is set as the file format as illustrated in FIG. 7A.

Figure 7A:
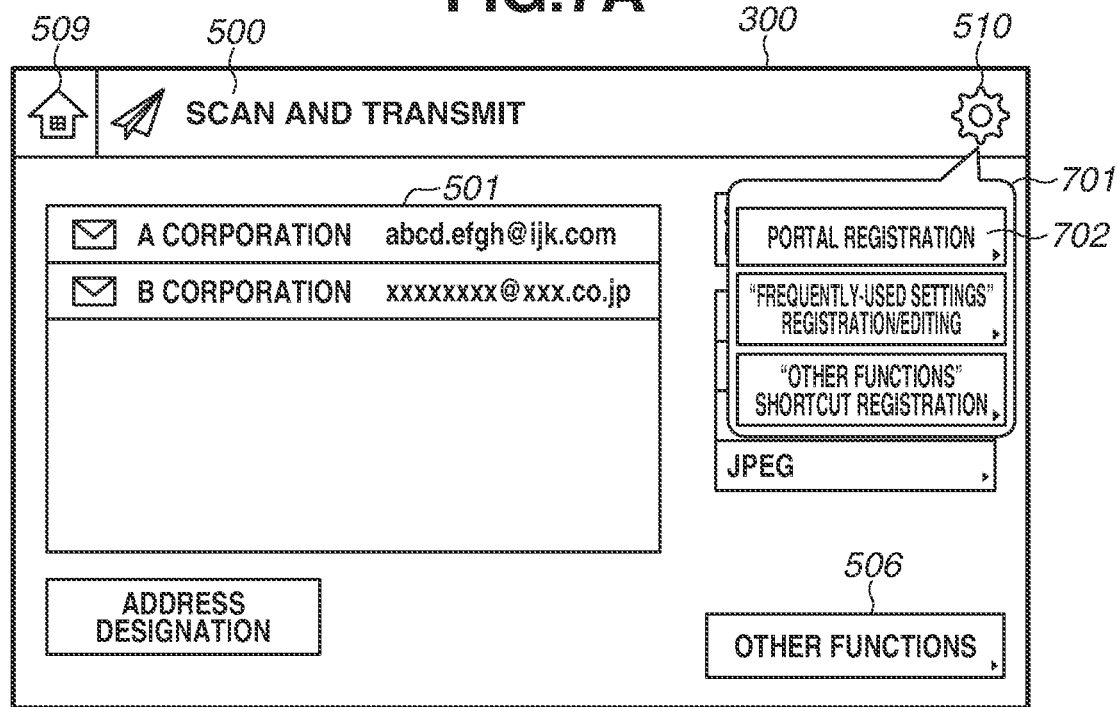
FIGS. 7A to 7D are schematic diagrams each illustrating an example of a screen to be displayed during custom button registration processing.

When the user presses the gear button 510 after changing the settings on the send setting screen 500, a menu list 701 illustrated in FIG. 7A is displayed. In step S601, the send application 2305 enters a custom button registration mode when the send application 2305 receives pressing of a "portal registration" button 702. In this case, the send application 2305 stores setting information set on the send setting screen 500. The information to be stored may be setting information about all settings, or may be setting information indicating settings that are different from the default settings.

Figure 7B:
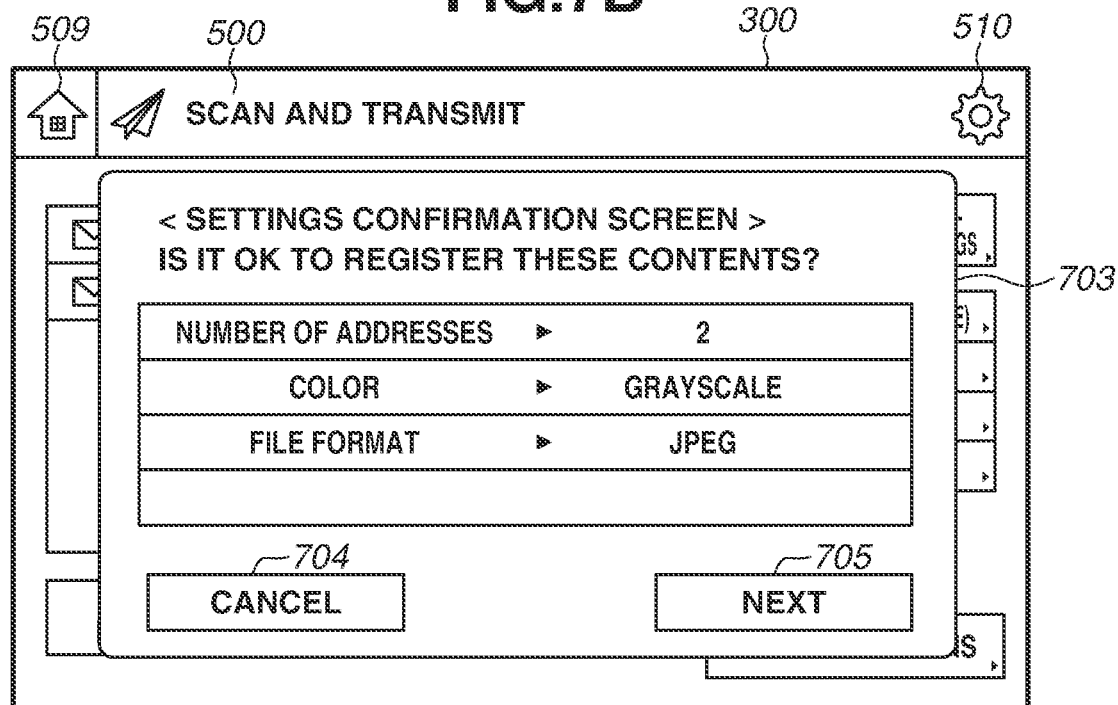

In step S602, the send application 2305 displays a confirmation screen 703 on the send setting screen 500 as illustrated in FIG. 7B. The confirmation screen 703 displays the contents (e.g., color, and file format setting) that are changed from the default settings by the user, a cancel button 704, and an OK button 705.

In step S603, the send application 2305 determines which one of the cancel button 704 and the OK button 705 is pressed. If the send application 2305 determines that the OK button 705 is pressed (YES in step S603), the processing proceeds to step S604. In step S604, the send application 2305 transmits a button registration request to the portal application 2307. If the send application 2305 determines that the cancel button 704 is pressed (NO in step S603), the processing ends. In the case of transmitting the registration request in step S604, the send application 2305 acquires, from the HDD 104, the application ID for the send application 2305 and the icon information, and notifies the portal application 2307 of the acquired information. Specifically, the send application 2305 acquires the application ID and the icon information (application ID: 101, icon information: send.bmp) from the storage area (including the common data unit 2302 and the send data unit 2306) of the send application 2305 set in the HDD 104. Then, the send application 2305 sends these pieces of information to the screen control unit 2301. The screen control unit 2301 notifies the portal application 2307 of these pieces of information. The portal application 2307 that has received the information stores the information in the storage area (including the common data unit 2302 and the portal data unit 2308) of the portal application 2307.

In step S605, the send application 2305 waits until custom button registration processing is executed by the portal application 2307.

Figure 7C:
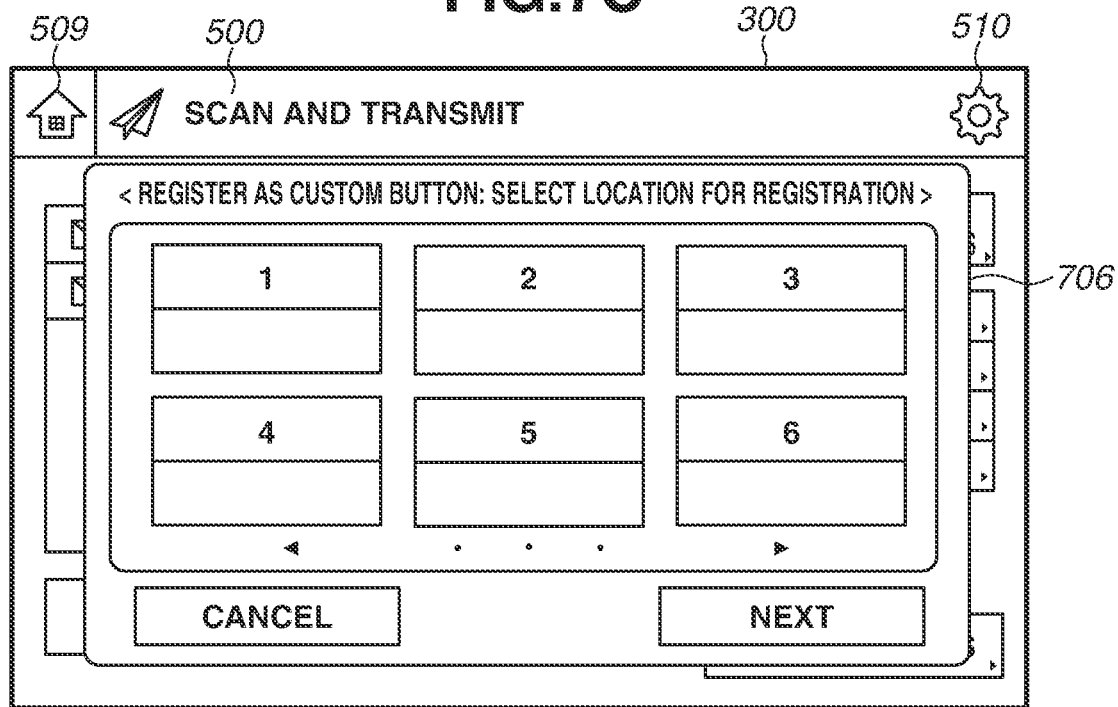
Figure 7D:
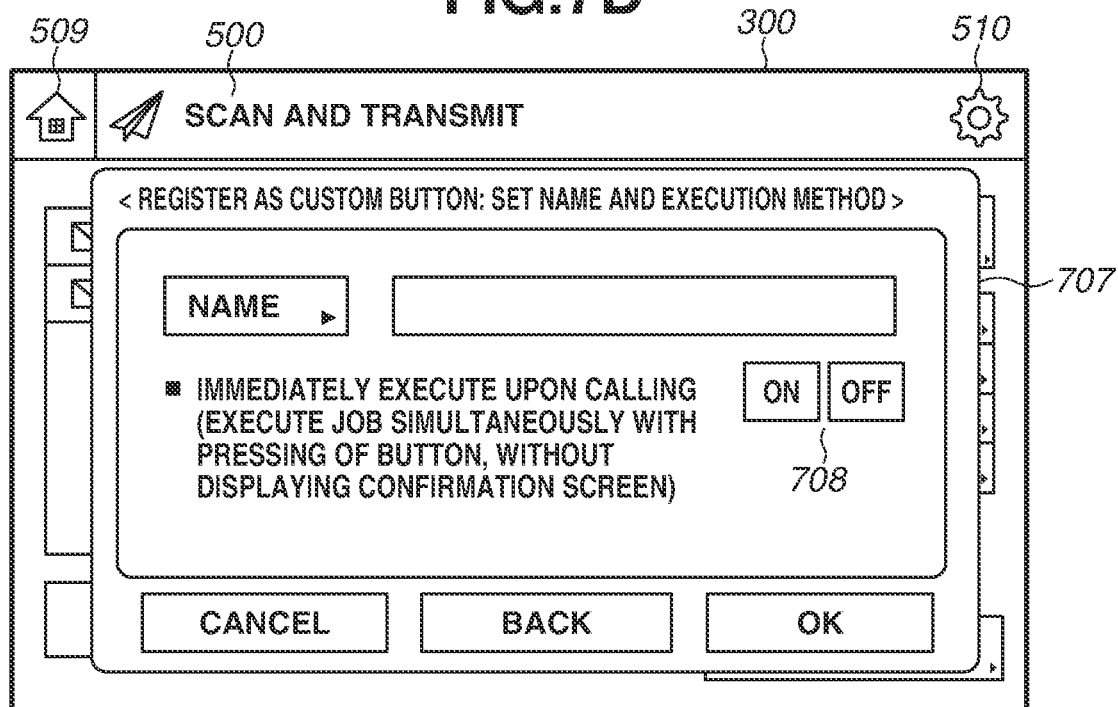
Figure 7E:
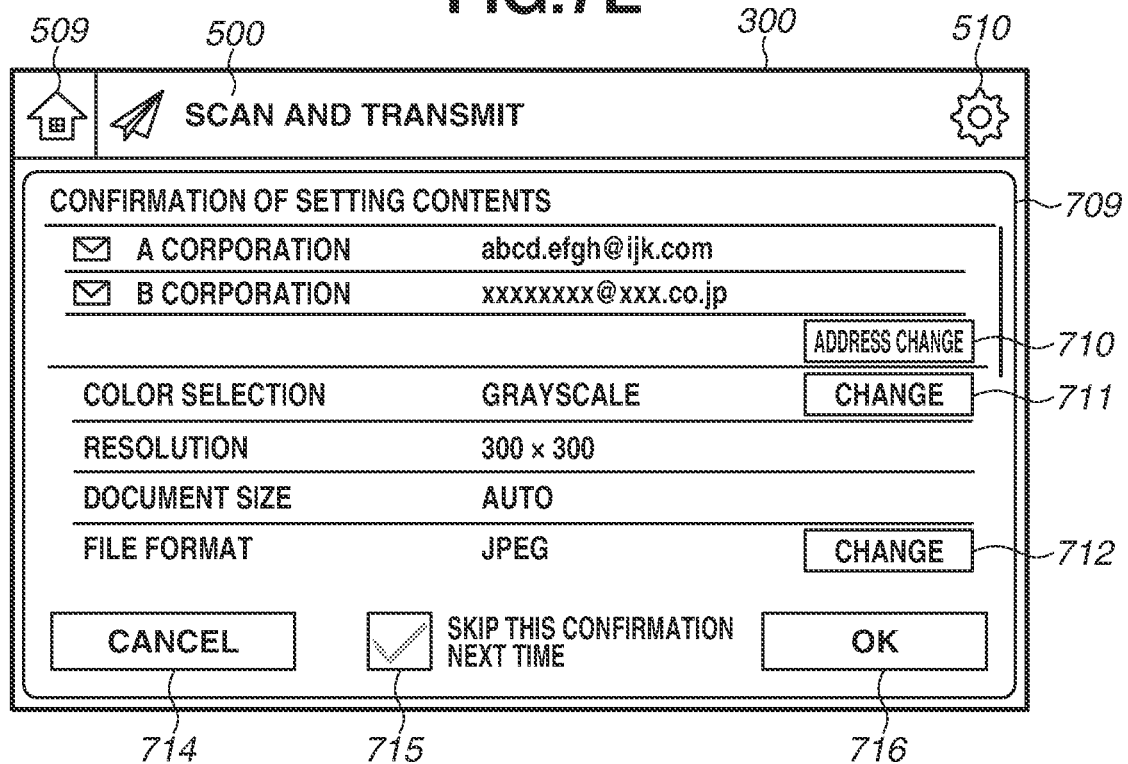
FIGS. 7E to 7G are schematic diagrams each illustrating a screen to be displayed during custom button execution processing.

Steps S607 to S609 indicate the custom button registration processing performed by the portal application 2307. In step S607, the portal application 2307 displays a setting screen related to the custom button to be registered upon reception of the registration request transmitted from the send application 2305 in step S604. As examples of the setting screen, FIG. 7C illustrates a button display setting screen 706, and FIG. 7D illustrates a button name and execution setting screen 707. The button display setting screen 706 is a screen for selecting a display position of a button to be registered on the portal screen 400. When a next button is pressed after the display position is selected ("6" is selected in this case), the screen transitions to the button name and execution setting screen 707. On the button name and execution setting screen 707, an input box for inputting a button display name and an ON/OFF button 708 for setting whether to use the custom button as the immediate execution button are displayed. When the user makes settings (in this case, "transmit to customer" is set as the name and "OFF" is set as the immediate execution setting) and presses an OK button, the processing proceeds to step S608.

In step S608, the portal application 2307 executes custom button creation processing based on the contents input and set on the setting screens 706 and 707. To create a custom button, the portal application 2307 generates the action ID for uniquely identifying the custom button to be registered this time. In the present exemplary embodiment, the action IDs are allocated in order from "1" every time a custom button is registered for each application. If the immediate execution setting is made, "01" is added to the end of the action ID. If the immediate execution setting is not made, "00" is added to the end of the action ID (in this case, the second custom button is registered for the send application 2305 and the immediate execution setting is not made, and thus "00" is added to the end of the action ID 2). The portal application 2307 then creates the custom button based on the button name, the created action ID, and the application ID sent from the send application 2305, and the icon information. Specifically, information about the "transmit to customer" button corresponding to the custom button No. 3 is registered in the storage area of the portal application 2307 set in the HDD 104 as indicated by the button information table 800 illustrated in FIG. 8.

In step S609, upon completion of creation of the custom button, the portal application 2307 transmits the generated action ID and a completion notification to the send application 2305, and thus the button registration processing performed by the portal application 2307 ends.

In step S606, the send application 2305 associates the action ID transmitted from the portal application 2307 in step S609 with the setting information stored in step S601, and stores the action ID and the setting information in the storage area of the send application 2305 set in the HDD 104. The processing then ends. FIG. 9 illustrates an example of setting information associated with the action ID stored in the storage area of the send application 2305 in the HDD 104.

FIG. 9 illustrates an example of setting information for each application stored in association with the action ID. As illustrated in a setting information table 900, icon information and setting information are associated with each action ID (setting information indicating "A Corporation, B corporation", "grayscale", and "JPEG" is stored in association with action ID: 2 "00").

Figure 10:
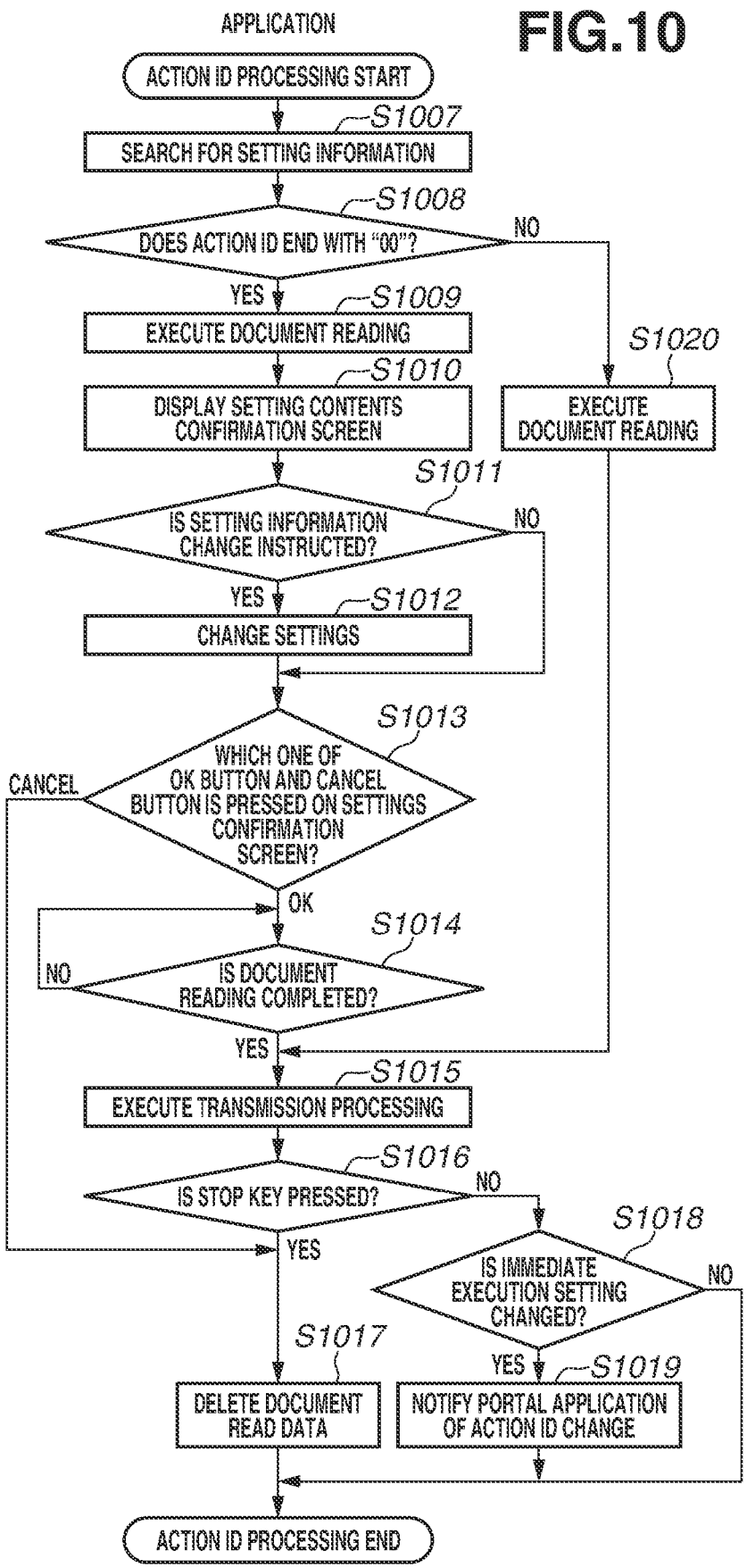
FIG. 10 is a flowchart illustrating processing executed when a custom button is pressed.

Processing to be executed when a custom button displayed on the portal screen 400 is pressed will be described with reference to FIG. 10. An example will be described where the custom button 406, which corresponds to the custom button No. 3 illustrated in FIG. 8 and does not correspond to the immediate execution button, is pressed on the portal screen illustrated in FIG. 4. FIG. 10 is a flowchart illustrating processing to be executed when the custom button is pressed. Each processing in the flowchart is implemented by the CPU 101 reading out control programs stored in the ROM 103 or the HHD 104 and executing the control programs. Processing to be executed by the send application 2305 is illustrated on the right part of FIG. 10, and processing to be executed by the portal application 2307 is illustrated on the left part of FIG. 10.

In step S1001, when the portal application 2307 detects pressing of the custom button 406 on the portal screen, the portal application 2307 refers to the button information table 800 stored in the HDD 104 and searches for information corresponding to the pressed custom button.

In step S1002, the portal application 2307 detects the application ID and action ID corresponding to the custom button 406 from the HDD 104, and notifies the application corresponding to the application ID of the action ID. In such a case, the portal application 2307 notifies the send application with the application ID "101" of the action ID 2 "00". In step S1003, the portal application 2307 waits until action ID processing is executed by the send application 2305.

The send application 2305 that has received the action ID refers to the setting information table 900 that has been stored in the HDD 104 in step S1007, and searches for setting information corresponding to the received action ID. In step S1008, the send application 2305 determines whether the received action ID ends with "00". If the action ID ends with "00" (YES in step S1008), the processing proceeds to step S1009. If the action ID does not end with "00" (NO in step S1008), the processing proceeds to step S1020. Since the action ID corresponding to the custom button 406 ends with "00", the processing proceeds to step S1009.

Figure 7F:
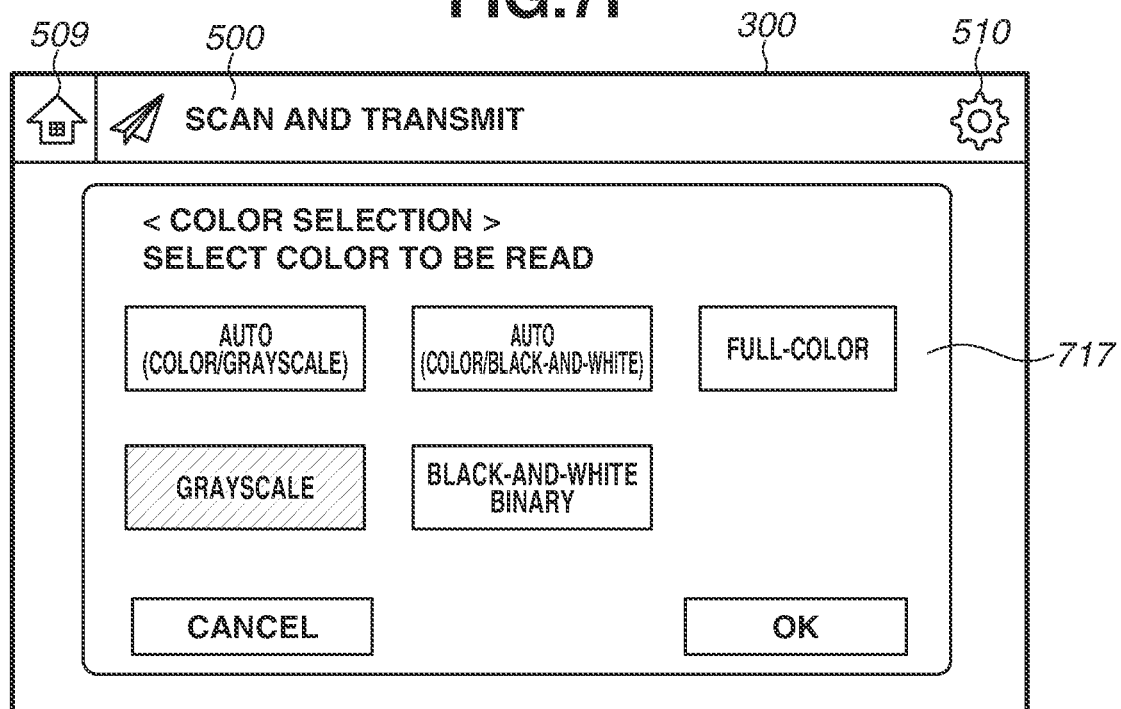

In step S1009, the send application 2305 starts a document reading operation. In step S1010, the settings confirmation screen is displayed as a pop-up screen on the touch panel 300. In other words, a settings confirmation screen is displayed during the document reading operation. In the present exemplary embodiment, the confirmation screen is displayed after the document reading operation is started. However, the operation sequence is not limited to this example, as long as at least a part of the document reading operation is executed during a period in which the confirmation screen is displayed. For example, the document reading operation may be executed after the confirmation screen is displayed. An example of the settings confirmation screen will be described with reference to FIG. 7E. The settings confirmation screen 709 illustrated in FIG. 7E is a screen on which setting information (setting value associated with the custom button 406) searched in step S1007 is displayed and which can be changed when any one of change buttons 710 to 712 is pressed. Since the document reading operation is already started, the settings (e.g., a resolution and a document size) for reading cannot be changed. On the other hand, settings for processing other than the document reading processing, such as a setting of an image data transmission destination, can be changed. FIG. 7F illustrates a color setting screen 717 to be displayed when a change button 711 is pressed. When the user changes the color setting on the color setting screen 717 and presses the OK button, the settings confirmation screen 709 in which the setting change is reflected is displayed. In this case, the changed setting is temporarily associated as setting information corresponding to the action ID in the setting information table 900, and thus processing can be executed with the changed setting only this time. If a conflict occurs in the setting changed by the user, for example, a notification may be issued, or the setting in which a conflict occurs may be grayed out, to thereby prevent the user from selecting the setting.

On the settings confirmation screen 709, a checkbox 715 for selecting whether to display the settings confirmation screen 709 is displayed in the subsequent processing. When the checkbox 715 is checked, the action ID is changed to an action ID that ends with "01", and thus the confirmation screen is not displayed in the subsequent processing. In other words, the custom button 406 is set as the immediate execution button. The description of the flowchart illustrated in FIG. 10 will be continued.

In step S1011, the send application 2305 determines whether an instruction to change the setting information is issued by pressing any one of the change buttons 710 to 712 on the settings confirmation screen 709. If the send application 2305 determines that an instruction to change the setting information is issued (YES in step S1011), the processing proceeds to step S1012. In step S1012, the setting information is changed, and then the processing proceeds to step S1013. If the send application 2305 determines that an instruction to change the setting information is not issued (NO in step S1011), the processing proceeds to step S1013.

In step S1013, the send application 2305 determines which one of the OK button 716 and a cancel button 714 is pressed on the settings confirmation screen 709. If the send application 2305 determines that the OK button 716 is pressed ("OK" in step S1013), the processing proceeds to step S1015. If the send application 2305 determines that the cancel button 714 is pressed ("CANCEL" in step S1013), the processing proceeds to step S1017.

In step S1014, the send application 2305 determines whether the document reading operation started in step S1009 is completed. If the send application 2305 determines that the document reading operation is completed (YES in step S1014), the processing proceeds to step S1015. If the send application 2305 determines that the document reading operation is not completed (NO in step S1014), the processing of step S1014 is repeated.

In step S1015, the send application 2305 executes processing associated with the custom button with the set contents. The processing executed in this case is processing to be executed after the document reading processing, which is processing for transmitting image data generated by scanning a document to the set address.

In step S1016, the send application 2305 determines whether the stop key 303 of the operation/display unit 112 is pressed during the transmission processing in step S1015. If the send application 2305 determines that the stop key 303 is pressed (YES in step S1016), the processing proceeds to step S1017. If the send application 2305 determines that the stop key is not pressed (NO in step S1016), the processing proceeds to step S1018.

In step S1017, the send application 2305 deletes the scanned image data, and terminates the action ID processing. In this case, when a plurality of documents is set on an auto document feeder (ADF) and the processing is cancelled in the process of feeding the plurality of documents, the document reading operation is interrupted at such a point, and image data on the scanned documents is deleted. After the image data is deleted, the display transitions to the portal screen 400 or the setting screen for the send application 2305.

In step S1018, the send application 2305 determines whether the checkbox 715 is checked on the settings confirmation screen 709. If the send application 2305 determines that the checkbox 715 is checked (YES in step S1018), the processing proceeds to step S1019. In step S1019, the send application 2305 notifies the portal application 2307 of the change of the action ID, and the send application 2305 ends the action ID processing. If the send application 2305 determines that the checkbox 715 is not checked (NO in step S1018), the send application 2305 terminates the action ID processing.

In step S1008, if the action ID does not end with "00", i.e., if the pressed custom button is set as the immediate execution button (NO in step S1008), the processing proceeds to step S1020. In step S1020, the document reading processing is started to execute transmission processing on the generated image data. Specifically, the processing associated with the button is executed without the step of displaying the confirmation screen in the case where the immediate execution button is pressed. For example, if a button for executing processing for transmitting the generated image data to a predetermined address is set as the immediate execution button, there is a possibility that the processing may be accidentally executed due to an erroneous operation by the user and the data may be transmitted to an incorrect address.

The description of the processing to be executed by the portal application 2307 will be continued. In step S1004, the portal application 2307 determines whether an action ID change notification is received. If the portal application 2307 determines that the action ID change notification is received (YES in step S1004), the processing proceeds to step S1005. In step S1005, the action ID corresponding to the information searched in step S1001 is changed. In other words, the end of the action ID is changed from "00" to "01" in step S1005 if the checkbox 715 is checked, and in step S1006, icon information indicating the immediate execution is acquired from the HDD 104 and stored. The button execution processing is then terminated. The button generated by changing the action ID to an action ID that ends with "01" can be operated as the immediate execution button in the subsequent processing.

The above-described flowchart illustrates an example where the custom button for transmitting image data generated by scanning a document to the set address. However, any button may be applied as long as the button is used to execute processing including the document reading operation. For example, the button may be a button for executing processing for transmitting image data generated by scanning a document to a cloud system, or a button for executing processing for storing image data generated by scanning a document in the MFP 1. In this case, when the button is pressed, the document reading operation starts and the user is prompted to confirm, for example, a transmission destination on the cloud system, and an image storage destination, on the confirmation screen, and thereby the user can change the setting.

In a case of setting a button for executing copy processing, the document reading operation starts simultaneously with pressing of the button, and the user is prompted to confirm the settings for output on the settings confirmation screen, and thereby the user can change the settings.

By using the processing in the flowchart described above, in a case where the button for executing processing including the document reading operation is pressed, the document reading operation is executed at a timing when the button is pressed, and the confirmation screen is displayed during the document reading operation. In the related art, the confirmation screen or the setting screen is displayed when the button is pressed, and the document reading operation is started to execute processing when a predetermined operation is received from the user. By using the processing in this flowchart, the confirmation screen is displayed during the document reading operation, which enables processing associated with the button to be executed more rapidly than the processing used in the related art.

Furthermore, it is possible to display the confirmation screen during the document reading operation and it is also possible to prompt the user to confirm the contents of processing. The processing can thereby be cancelled even if the button is accidentally pressed by the user, and the settings can also be changed on the confirmation screen. In the case of executing processing for transmitting image data generated by scanning a document to the set address, an erroneous transmission operation caused due to an error in operation can be avoided, while processing can be rapidly executed.

Figure 11:
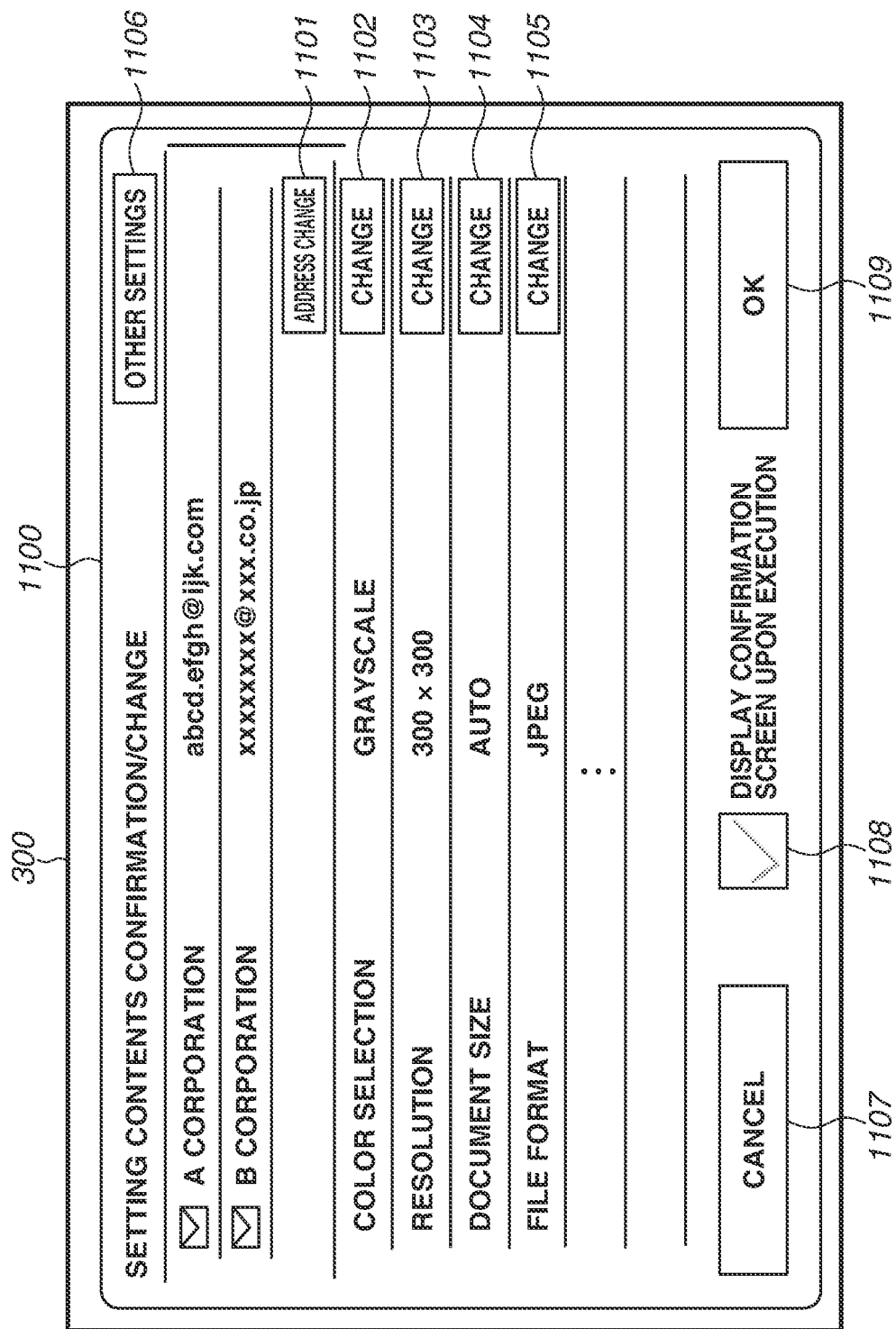
FIG. 11 illustrates an example of a screen displayed when a custom button is pressed for execution.

The present exemplary embodiment described above illustrates an example where the document reading operation is started in step S1009 if the button pressed in step S1008 is not set as the immediate execution button. Alternatively, the settings confirmation screen may be displayed prior to the document reading operation if the button pressed in step S1008 is not set as the immediate execution button. In this case, as illustrated in a settings confirmation screen 1100 illustrated in FIG. 11, settings for document reading, such as a setting of a resolution, can also be changed by pressing a change button 1103. This is because the document reading processing is not executed at this point. Other settings that are not displayed on the settings confirmation screen 1100 can also be changed by pressing an other settings button 1106.

The first exemplary embodiment described above illustrates an example where the processing proceeds to step S1015 if the condition that the OK button 716 is pressed on the settings confirmation screen 709 is satisfied in step S1013. In this case, however, the processing does not proceed to the subsequent step unless the OK button is pressed by the user. A second exemplary embodiment illustrates an example where the processing proceeds to step S1015 even if the OK button is not pressed on the settings confirmation screen 709 in step S1013. The basic configuration of the second exemplary embodiment is the same as that of the first exemplary embodiment, and thus only differences between the second exemplary embodiment and the first exemplary embodiment will be described.

In the present exemplary embodiment, the settings confirmation screen 709 is displayed until the document reading operation started in step S1009 is completed. If the cancel button 714 is pressed on the settings confirmation screen 709 before the document reading operation is completed in step S1013 ("CANCEL" in step S1013), the processing proceeds to step S1017 to cancel the processing. If the cancel button 714 is not pressed before the document reading operation is completed ("OK" in step S1013), the processing proceeds to step S1015 after the document reading operation is completed in step S1014.

In the above-described exemplary embodiment, the processing can be cancelled if an incorrect button is pressed. If a correct button is pressed, the processing proceeds to the subsequent step without the need for pressing the OK button on the settings confirmation screen 709, which leads to an improvement in operability. Displaying the settings confirmation screen 709 until the document reading operation is completed is merely an example. Alternatively, the settings confirmation screen 709 may be displayed for a predetermined period, and the processing may proceed to the subsequent step unless the cancel button is pressed.

In the first exemplary embodiment, it may be desirable to turn on the immediate execution setting on the button name and execution setting screen 707, or to check the checkbox 715 on the setting contents confirmation screen 709 so as to set the custom button as the immediate execution button. A third exemplary embodiment illustrates an example where a screen for setting the custom button as the immediate execution button is automatically displayed when a custom button that is not set as the immediate execution button is used a predetermined number of times. The basic configuration of the present exemplary embodiment is the same as that of the first exemplary embodiment, and thus only differences between the third exemplary embodiment and the first exemplary embodiment will be described.

Figure 12A:
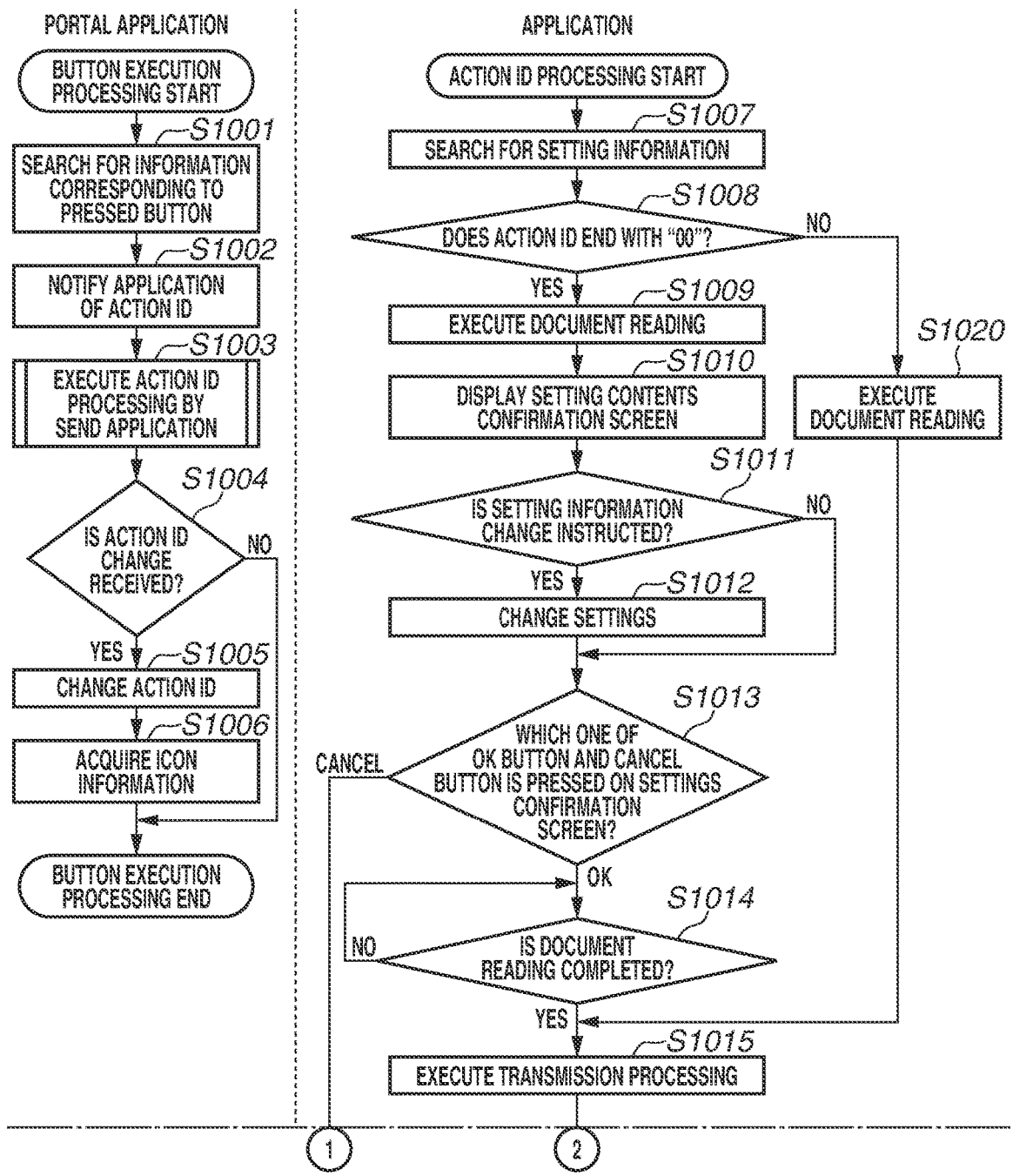

In the third exemplary embodiment, processing in a flowchart illustrated in FIGS. 12A and 12B is executed instead of the processing in the flowchart illustrated in FIG. 10 according to the first exemplary embodiment. The flowchart illustrated in FIGS. 12A and 12B differs from the flowchart illustrated in FIG. 10 in regard to steps S1201 to S1207.

In step S1201, the send application 2305 determines whether the action ID corresponding to the pressed custom button ends with "00". If the action ID ends with "00" (YES in step S1201), the processing proceeds to step S1202. If the action ID does not end with "00" (NO in step S1201), the processing ends.

In step S1202, the send application 2305 increments the count of the number of executions corresponding to the pressed custom button by "1". In the present exemplary embodiment, the number of times of using each button is counted and stored as illustrated in FIG. 9B. In this case, the number of times of executions corresponding to the action ID for the pressed custom button is incremented by "1" and stored.

Figure 7G:
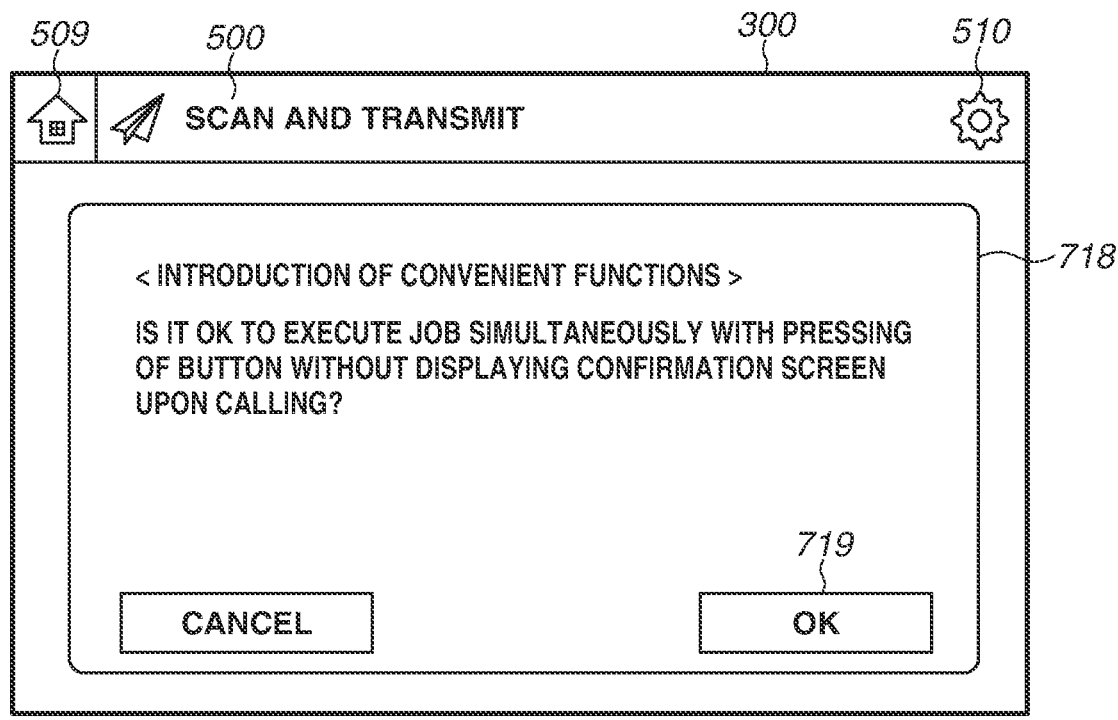

In step S1203, the send application 2305 determines whether the number of executions of the pressed custom button has reached a predetermined value with reference to a table illustrated in FIG. 9B. Assume herein that the predetermined value is "10". If the number of executions is "10" (YES in step S1203), the processing proceeds to step S1204. In step S1204, the send application 2305 displays a screen 718 for prompting the user to set the pressed custom button as the immediate execution button as illustrated in FIG. 7G. If the number of executions has not reached "10" (NO in step S1203), the processing ends.

In step S1205, the send application 2305 determines whether an OK button 719 is pressed on the screen displayed in step S1204. If the OK button 719 is pressed (YES in step S1205), the processing proceeds to step S1206. If the OK button 719 is not pressed (NO in step S1205) (or if the cancel button is pressed), the processing proceeds to step S1207.

In step S1207, the count corresponding to the pressed custom button is reset to "0".

By the processing in the flowchart described above, the custom button can be operated as the immediate execution button in the subsequent processing if the OK button 719 is pressed on the screen displayed in step S1204. Thus, it is possible to prompt the user to set the custom button as the immediate execution button if the user uses a custom button a predetermined number of times, without the need for the user to intentionally set the custom button as the immediate execution button.

The first exemplary embodiment described above illustrates an example where if the custom button corresponding to processing including the document reading operation is pressed, the document reading operation starts at a timing when the button is pressed. In the second exemplary embodiment, not only the custom button, but also an application button may be used to start the document reading operation at a timing when the custom button is pressed. For example, when the send application button 402 is pressed, the document reading operation may be started at a timing when the send application button is pressed, and the setting screen 500 may be displayed upon execution of the reading operation to receive a setting change from the user. In such a case, settings for document reading, such as a setting of a resolution, cannot be made.

More alternatively, the document reading operation may be started at a timing when a setting for document reading is received on the setting screen 500, instead of starting the document reading operation at a timing when the application button 402 is pressed. In such a case, the user can set, for example, an image data transmission destination during the document reading operation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus that displays a menu screen, the information processing apparatus comprising:
   at least one memory; and
   at least one processor in communication with the at least one memory,
   wherein the at least one processor of the information processing apparatus is configured to perform:
   displaying a display object for executing first processing including document reading processing on the menu screen, wherein the display object is displayed on the menu screen based on a registration operation performed by a user;
   displaying a confirmation screen based on reception of an operation on the display object from the user, wherein the confirmation screen includes at least a part of setting content of the first processing and a confirmation software key for receiving a confirmation of execution of the first processing from the user;
   executing at least a part of the document reading processing included in the first processing in parallel with the display of the confirmation screen; and
   executing processing subsequent to the document reading processing included in the first processing.

2. The information processing apparatus according to claim 1, wherein the display object is associated with one or more setting values and the first processing is executed based on the setting values.

3. The information processing apparatus according to claim 1, wherein the contents of the first processing are a setting for the first processing and the setting is changeable on the confirmation screen.

4. The information processing apparatus according to claim 3, wherein the changeable setting is a setting for processing other than the document reading processing included in the first processing.

5. The information processing apparatus according to claim 1, wherein the processing subsequent to the document reading processing is not executed until a predetermined operation is received on the confirmation screen.

6. The information processing apparatus according to claim 1, wherein, in a case where an operation for canceling execution of the first processing is received on the confirmation screen, the first processing is cancelled and image data generated in the document reading processing is deleted.

7. The information processing apparatus according to claim 1, wherein the document reading processing is started at a timing when an operation on the display object displayed is received from the user.

8. The information processing apparatus according to claim 1, wherein the processing including the document reading processing is processing for transmitting image data generated by scanning a document by the information processing apparatus to an external apparatus.

9. The information processing apparatus according to claim 1, wherein the processing including the document reading processing is copy processing.

10. The information processing apparatus according to claim 1, wherein the confirmation screen includes a cancel key for canceling execution of the first processing.

11. The information processing apparatus according to claim 1, wherein, in a case where the confirmation software key is selected, the processing subsequent to the document reading processing is executed.

12. The information processing apparatus according to claim 1, wherein the display object is an object for, when pressed, executing the first processing without displaying a setting screen for the first processing.

13. An information processing apparatus that displays a menu screen, the information processing apparatus comprising:
    at least one memory; and
    at least one processor in communication with the at least one memory,
    wherein the at least one processor of the information processing apparatus is configured to perform:
    displaying a display object for executing first processing including document reading processing on the menu screen, wherein the display object is displayed on the menu screen based on a registration operation performed by a user;
    displaying a confirmation screen based on reception of an operation on the display object from the user, wherein the confirmation screen includes at least a part of setting content of the first processing;
    executing the document reading processing included in the first processing based on reception of an operation on the display object; and
    executing processing subsequent to the document reading processing included in the first processing, wherein the processing subsequent to the document reading processing is executed based on reception of a predetermined operation on the confirmation screen.

14. The information processing apparatus according to claim 13, wherein at least a part of the document reading processing is executed concurrently with display of the confirmation screen.

15. The information processing apparatus according to claim 13, wherein the processing subsequent to the document reading processing is not executed until the predetermined operation is received on the confirmation screen.

16. The information processing apparatus according to claim 13, wherein the confirmation screen includes a first key for receiving a confirmation of the setting content of the first processing from the user and a second key for cancelling execution of the first processing.

17. The information processing apparatus according to claim 16, wherein the predetermined operation is selection of the first key.

18. An information processing method that displays a menu screen, the method comprising:

displaying a display object for executing first processing including document reading processing on the menu screen, wherein the display object is displayed on the menu screen based on a registration operation performed by a user;

displaying a confirmation screen based on reception of an operation on the display object from the user, wherein the confirmation screen includes at least a part of setting content of the first processing and a confirmation software key for receiving a confirmation of execution of the first processing from the user;

executing at least a part of the document reading processing included in the first processing in parallel with the display of the confirmation screen; and executing processing subsequent to the document reading processing included in the first processing.

* * * * *